United States Patent
Anderson et al.

(10) Patent No.: US 9,411,682 B2
(45) Date of Patent: Aug. 9, 2016

(54) SCRUBBING PROCEDURE FOR A DATA STORAGE SYSTEM

(75) Inventors: Eric A. Anderson, Palo Alto, CA (US); Xiaozhou Li, Cupertino, CA (US); Mehul A. Shah, Saratoga, CA (US); John J. Wylie, San Francisco, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1698 days.

(21) Appl. No.: 12/687,361

(22) Filed: Jan. 14, 2010

(65) Prior Publication Data

US 2011/0173162 A1    Jul. 14, 2011

(51) Int. Cl.
G06F 11/00 (2006.01)
G06F 17/00 (2006.01)
G06F 11/10 (2006.01)

(52) U.S. Cl.
CPC ...... *G06F 11/1076* (2013.01); *G06F 2211/104* (2013.01); *G06F 2211/1088* (2013.01)

(58) Field of Classification Search
CPC .......... G06F 11/1076; G06F 2211/104; G06F 2211/1088
See application file for complete search history.

(56) References Cited

U.S. PATENT DOCUMENTS

| | | | |
|---|---|---|---|
| 5,278,838 A * | 1/1994 | Ng et al. | 714/6.12 |
| 7,103,824 B2 | 9/2006 | Halford | |
| 7,266,716 B2 | 9/2007 | Frolund et al. | |
| 7,650,529 B2 | 1/2010 | Fan et al. | |
| 7,873,878 B2 * | 1/2011 | Belluomini et al. | 714/52 |
| 8,006,125 B1 * | 8/2011 | Meng et al. | 714/6.12 |
| 8,458,513 B2 * | 6/2013 | Wylie | G06F 11/1076 714/6.1 |
| 2006/0075288 A1 * | 4/2006 | Forrer et al. | 714/6 |
| 2008/0198752 A1 | 8/2008 | Fan et al. | |
| 2008/0253283 A1 | 10/2008 | Douglis et al. | |
| 2009/0204768 A1 * | 8/2009 | Bruening et al. | 711/136 |
| 2010/0037056 A1 * | 2/2010 | Follis | G06F 11/1464 713/171 |
| 2012/0030511 A1 * | 2/2012 | Wylie | G06F 11/1076 714/15 |
| 2012/0290541 A1 * | 11/2012 | Anderson | G06F 11/106 707/685 |
| 2014/0181236 A1 * | 6/2014 | Venkatesh | H04L 67/1097 709/214 |

OTHER PUBLICATIONS

John MacCormick et al., "Kinesis: A New Appoach to Replica Placement in Distrbued Storage Systems", ACM Transactions on Storage, vol. 4, No. 4, Article 11, Publication date: Jan. 2009, pp. 11:1-11:28.
Hewlett-Packard Development Company, L.P., PCT Application No. PCT/US2010/020972, entitled "Recovery Procedure For A Data Storage System", filed Jan. 14, 2010.

(Continued)

*Primary Examiner* — Jung Kim
*Assistant Examiner* — James J Wilcox
(74) *Attorney, Agent, or Firm* — Trop, Prunner & Hu, P.C.

(57) ABSTRACT

A method is provided for scrubbing information stored in a data storage system where the information is stored as a plurality of encoded fragments across multiple storage devices. The method includes maintaining on a first storage device a list of metadata entries corresponding to values that are stored in the data storage system at an At Maximum Redundancy (AMR) state, verifying that encoded fragments associated with each of the metadata entries are stored on a second storage, verifying that a corresponding metadata entry is stored on the first storage device for each encoded fragment that is stored on the second storage device, and scheduling for recovery any missing encoded fragments and/or any missing metadata entry.

21 Claims, 9 Drawing Sheets

(56) References Cited

OTHER PUBLICATIONS

Eric A. Anderson, "Efficient eventual consistency in Pahoehoe, an erasure-coded key-blob archive". Proceedings of DSN 2010, The 40th Annual IEEE/IFIP International Conference on Dependable Systems and Networks, Jun. 28-Jul. 1, 2010, Chicago Illinois USA, 10 pages.

John J. Wylie et al., U.S. Appl. No. 12/847,203, entitled "Efficient Failure Recovery in a Distributed Data Storage System", filed Jul. 30, 2010.

* cited by examiner

SCRUBBING PROCEDURE FOR A DATA STORAGE SYSTEM

CROSS-REFERENCE TO RELATED APPLICATIONS

This application is related to International Application No. PCT/US2010/020972, entitled, "RECOVERY PROCEDURE FOR A DATA STORAGE SYSTEM," which was filed on Jan. 14, 2010.

BACKGROUND

Many enterprises, and particularly Internet-based businesses, demand vast storage to store petabytes of large, binary objects that are referred to as "blobs." Examples of such businesses include photo and video sharing Internet sites, e-auction sites, social networking sites, etc., for which information may be stored in geographically distributed storage nodes or data centers. Customers of these businesses need access to the stored information around the clock from locations around the globe. To perform satisfactorily for their customers, these types of businesses generally require reliable storage of the objects indefinitely into the future; quick retrieval of the objects at any time from any place in response to customer requests even in the face of data center outage and network partitions; and seamless scalability of storage capacity as the business expands. Oftentimes, these businesses use storage systems referred to as key-value stores to store the numerous binary large objects, where the value represents the blob to be stored in the system and the key provides an identifier that is associated with the value.

BRIEF DESCRIPTION OF THE DRAWINGS

Some embodiments of the invention are described with respect to the following figures.

DETAILED DESCRIPTION

Embodiments of the invention are directed toward a scalable storage system, which, for convenience only, will be referred to herein as a "key-blob archive" or KBA. It should be understood, however, that the invention is not limited to KBAs, but is applicable to any type of data storage system. In exemplary embodiments, the KBA has a simple programming interface so that developers can easily build features on top of it. In addition, exemplary embodiments of the KBA include self-healing features that provide for reliable storage of information even in the face of system failures. These self-healing features may allow the KBA to continue to operate and provide services to users even under severe failure conditions, such as network partitioning, data center failures, etc. Yet further, embodiments of the KBA scale seamlessly, so that storage capacity can easily grow as business needs expand. Because of the nature of the services that may be offered to a user of a KBA system (e.g., around-the-clock, around-the-globe access to vast numbers of large, binary objects), embodiments of the KBA provide fast, reliable access to stored information despite various, simultaneous disaster situations (e.g., destruction of a data center, loss of a storage rack, etc.). In addition, to meet the needs of diverse types of businesses, exemplary embodiments of the KBA may offer the ability to tune the level of consistency and redundancy on a per-blob basis, thus providing the ability to tradeoff between performance and cost of the system in accordance with the business' priorities.

Figure 1:
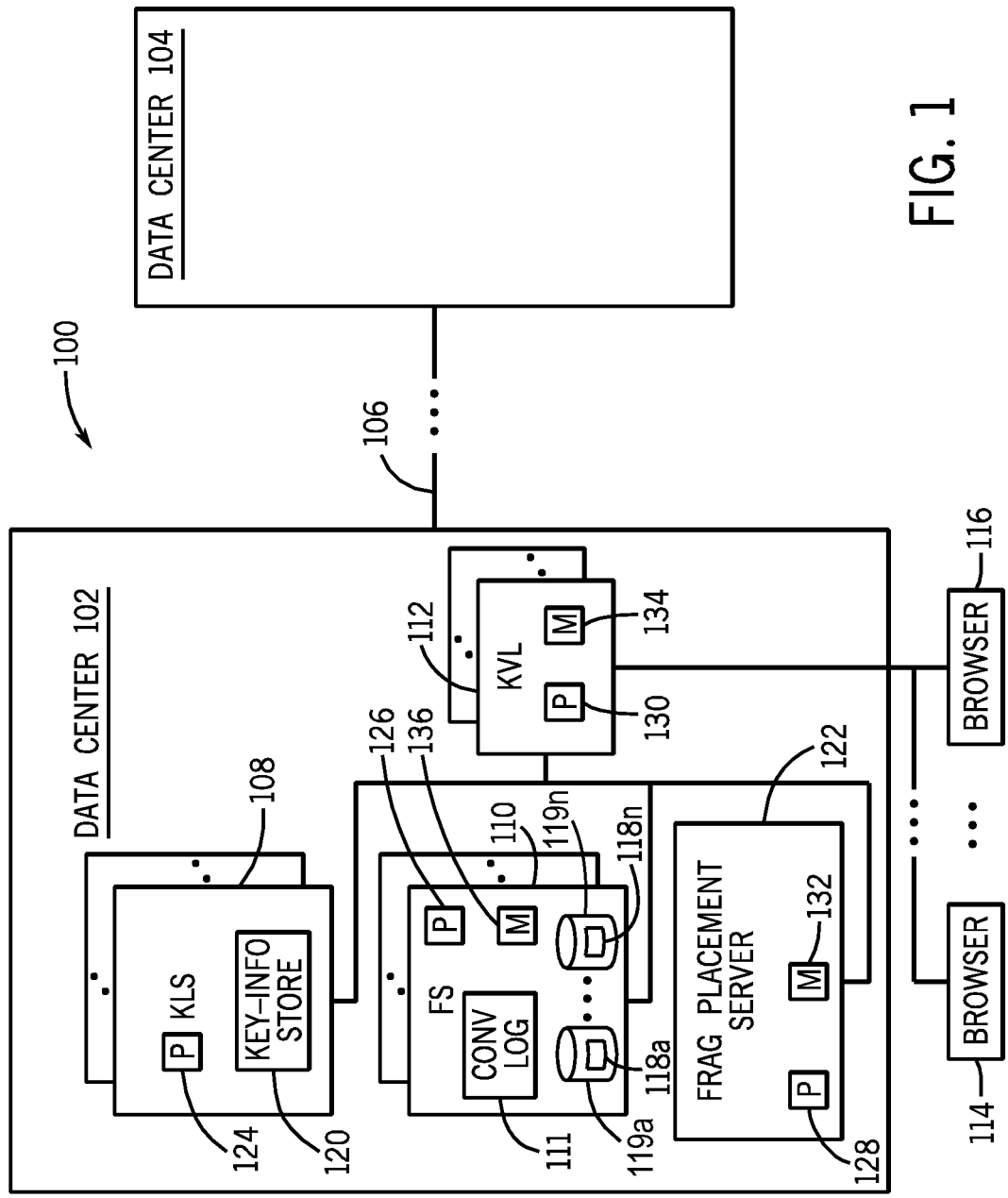
FIG. 1 is a block diagram of an exemplary data storage system, in accordance with an embodiment of the invention.

Examples of a KBA and its various features are illustrated in the Figures. In the description which follows, the KBA is considered a key-value storage system, where the value is the object to be inserted into the KBA and the key is an identifier associated with the value. Turning first to FIG. 1, an exemplary KBA 100 includes a plurality of storage nodes (e.g., data centers) 102 and 104 coupled via a network 106. The network 106 may include, for example, a local area network (LAN), a wide area network (WAN), a storage area network (SAN), the Internet, or any other type of communication link. In addition, the interconnect 106 may include system busses or other fast interconnects. The storage nodes 102 and 104 may be located at geographical locations that are remote from one another. Although two storage nodes are shown, it should be understood that the KBA 100 can include any number of nodes depending up the particular application in which the KBA 100 is implemented.

As shown in FIG. 1, storage node 102 includes one or more key look-up servers (KLS) 108 and one or more fragment servers (FS) 110. The KBA 100 also includes one or more key-value libraries (KVL) 112 that are in communication with one or more users, such as via browsers 114, 116. In general, the KVL 112 receives requests from the users regarding values (or blobs) and executes the protocols for interacting with the fragment servers 110 and key-look up servers 108 to either insert or retrieve the values from the KBA 100. In an exemplary embodiment, a proxy or application (not shown) may actually receive the requests from the users and then gain access to the KBA 100 by using calls in the KVL 112. In a very general sense, which will be explained in more detail below, the fragment servers 110 collectively store the values (e.g., in encoded fragments) in fragment stores 118 *a-n* on one or more non-volatile storage devices 119*a-n*, such as a magnetic memory device, optical memory device, flash memory device, etc. Each fragment server 110 includes at least one fragment store 118. The key-lookup servers 108 maintain metadata for every key that is associated with a value that has been inserted into the KBA 100. The metadata generally provides information regarding the value, such as timestamp information, storage locations, size, type, redundancy requirements, etc. The key-lookup servers 108 include a key-info store 120 (e.g., one or more non-volatile storage devices)

which durably stores the key to key-info mapping. In one embodiment, each key-lookup server 108 has one key-info store 120.

As shown in FIG. 1, storage node 102 also includes a fragment placement server 122 which tracks free space information for all of the fragment servers 110 within storage node 102. In general, as will be explained in further detail below, the fragment placement server 122 decides which fragment servers 110 within storage node 102 should host fragments for a particular value being inserted into the KBA 100.

Although not shown, the storage node 104 has the same architecture as storage node 102 and, thus, also includes one or more key lookup servers 108, one or more fragment servers 110, a key-value library 112, a fragment placement server 122, etc. In addition, although only two storage nodes 102, 104 are shown in FIG. 1, it should be understood that a KBA 100 may include two or more storage nodes. Further, in some embodiments, to provide for redundancy, each storage node 102, 104 may have at least one replicated pair of key-lookup servers 108, one replicated pair of fragment placement servers 122, and multiple fragment servers 110. In addition, each of the servers may include a processing device 124, 126, 128, 130, such as a microprocessor, microcontroller, etc., and a memory 120, 132, 134, 136 for storing various applications and data, for instance. Memories 120, 132, 134, 136 may include both durable and non-durable storage elements and may further cooperate with the processing devices 123, 126, 128, 130 in executing instructions of software.

The various components of the KBA 100 illustrated in FIG. 1 communicate via a messaging protocol. For instance, in one embodiment of the KBA 100, a simple request protocol for storing and retrieving values in and from the KBA 100 is implemented. In general, this interface includes Put and Get operations to write information to and retrieve information from the KBA 100, respectively. The Put operation ensures that the various fragments corresponding to the value are stored at appropriate fragment servers 110 and that all key-lookup servers 108 are made aware of the locations at which those fragments are stored. In one embodiment, the Put operation is expressed as Put(key, blob, rspec) and inserts the value into the KBA 100 together with the key that corresponds to the value. The key may be a small string (e.g., less than 1 kilobyte), while the value may be relatively large (e.g., a hundred kilobytes to hundreds of megabytes). For reliability purposes, the redundancy specification (i.e., rspec) relates to the desired redundancy level for that particular value. Rspec may have several parameters. For instance, for systems which employ erasure correction coding algorithms (e.g., Reed-Solomon erasure codes), these parameters may include the number of fragments into which the value should be divided, how many redundant (or parity) fragments to generate (which are used to reconstruct the value in the event some fragments are lost or unavailable), and the manner in which the fragments should be distributed across the various storage nodes. Rspec also may specify when the Put operation can be considered successful, which provides a knob that can affect consistency. It should be noted here that, although the key identifies a value, keys need not be unique. For instance two (key, value) pairs with the same key may be inserted into the KBA, but may be timestamped. In such instances, the values may be treated as two versions of the same key.

Values associated with a key may be retrieved from the KBA 100 using a Get(key) operation. Generally, the Get operation locates the fragments for the value associated with a given key and returns the whole value as inserted by a previous Put operation. In some instances, the Get operation may return an error indicating that no version of the value was available. In one embodiment, when executing a Get operation, the KBA 100 may exert its best effort to retrieve the latest version of the value. However, if a new version was recently inserted, or if failures have made the most recent version of the value unavailable, then the Get may return an older version. In extreme cases, the Get may return a key-not-found indication.

The KBA 100 illustrated in FIG. 1 functions as an archive and, thus, is configured to provide highly durable storage. This may be accomplished using erasure correction coding techniques, including replication and reconstruction of data from fragments. In one embodiment, both metadata (i.e., information about the value) and data (i.e., the value itself) are stored in the KBA 100. In such an embodiment, the metadata may be replicated in each storage node 102, 104 so that the KBA 100 will remain available during recovery and reconstruction. The values, however, are much larger than the metadata, rendering it extremely costly to provide redundancy through replication. Accordingly, in some embodiments of the KBA 100, erasure codes may be used for the values and the type of coding may be specified through the use of the rspec parameter.

For instance, in one embodiment, the redundancy specification (rspec) may be specified as a tuple (n, a, b) for each value put into the KBA 100, where n is the number of fragments to break the data into, a is the number of ECC fragments to store at a first storage node (and hence the number of disk failures to tolerate at that storage node), and b is the number of ECC fragments to store at a second storage node. In accordance with this error coding scheme, as long as n fragments, of any type and at all storage nodes, are available, the data can be reconstructed. For example, for an rspec (4, 2, 6), any four fragments are needed to reconstruct the value, and six fragments each are stored at each storage node (i.e., four data fragments and two ECC fragments are stored at the first storage node, and six ECC fragments are stored at the second storage node). In other embodiments, the rspec may be defined in other manners as appropriate to implement the type of encoding that is used.

As briefly mentioned above, in some embodiments, the KBA 100 uses Put and Get operations to insert and retrieve values. In addition to these operations, the KBA also may implement various recovery protocols, including a convergence protocol for recovering lost fragments, a scrubbing protocol for detecting corrupted or lost fragments, a purging protocol for removing stale data from the KBA, and an abandonment protocol for removing partial values that cannot be recovered. In an exemplary embodiment, the terminology used in conjunction with these protocols includes the following terms:

Key: an uninterpreted binary string. Keys need not be the same length. In one embodiment, the keys are at most 10 kilobytes.

Value: an uninterpreted binary string. Values need not be the same length. In one embodiment, the values range from 10 kilobytes to 1 gigabyte.

Node ID: a unique identifier for each node in the KBA. In one embodiment, each KVL host, fragment placement server, KLS, and FS is a node.

Key-value timestamp (kvt): a (timestamp, node ID) pair. The kvt is constructed based on the node's local clock.

Fragment: a fragment has two parts: a header, and the erasure-coded fragment based on encoding the value. In one embodiment, the header includes the key, kvt, rspec, fragment number (effectively an index), value size, value hash, fragment hash, and cross-fragment hash.

Redundancy specification (rspec): describes the redundancy requirements for a value. In general, in one embodiment, rspec indicates how many storage nodes store fragments and the number of data fragments and parity fragments to store at each storage node. Rspec may also specify the maximum number of erasure-coded fragments for a given Put operation that can be stored at the same FS.

Fragment location: a (fragment server ID, fragment store ID, fragment number) tuple. In one embodiment, the fragment server ID is a node ID and thus is globally unique. The fragment store ID is a unique ID within a fragment server.

Placement: a list of fragment locations.

Key-info: a (kvt, rspec, placement) tuple. During the course of a Put operation, a key-info is constructed for the Put and sent to all the KLSs and all FSs that have been selected to store a fragment for the Put. A key-info may allow a Get operation to locate all necessary fragments to decode and validate a value.

It should be understood that the foregoing terminology is illustrative and only intended to facilitate the following description. The implementation of the KBA 100 is not dependent on the particular terminology used. The KBA 100 protocol may use other terminology that includes more, fewer, and/or different terms having more, fewer, and/or different parameters.

In an exemplary embodiment of the KBA 100 using the terminology defined above, a Put operation is used to insert values into the KBA. The Put generally includes selecting locations at which to store fragments in accordance with a desired rspec; updating metadata (i.e., the key-info) and storing fragments; and determining the completeness of the insertion of the value into the KBA. The return from the Put operation depends on the rspec and on how redundantly the value actually was stored. In general, if KLSs store the appropriate key-infos and sufficient fragment servers store the appropriate fragments to meet the rspec, then the Put operation is successful. The various components of the KBA shown in FIG. 1, including the KLSs, the FSs, and the KVL in each of the storage nodes interact with one another via messaging to implement these operations.

Figure 2:
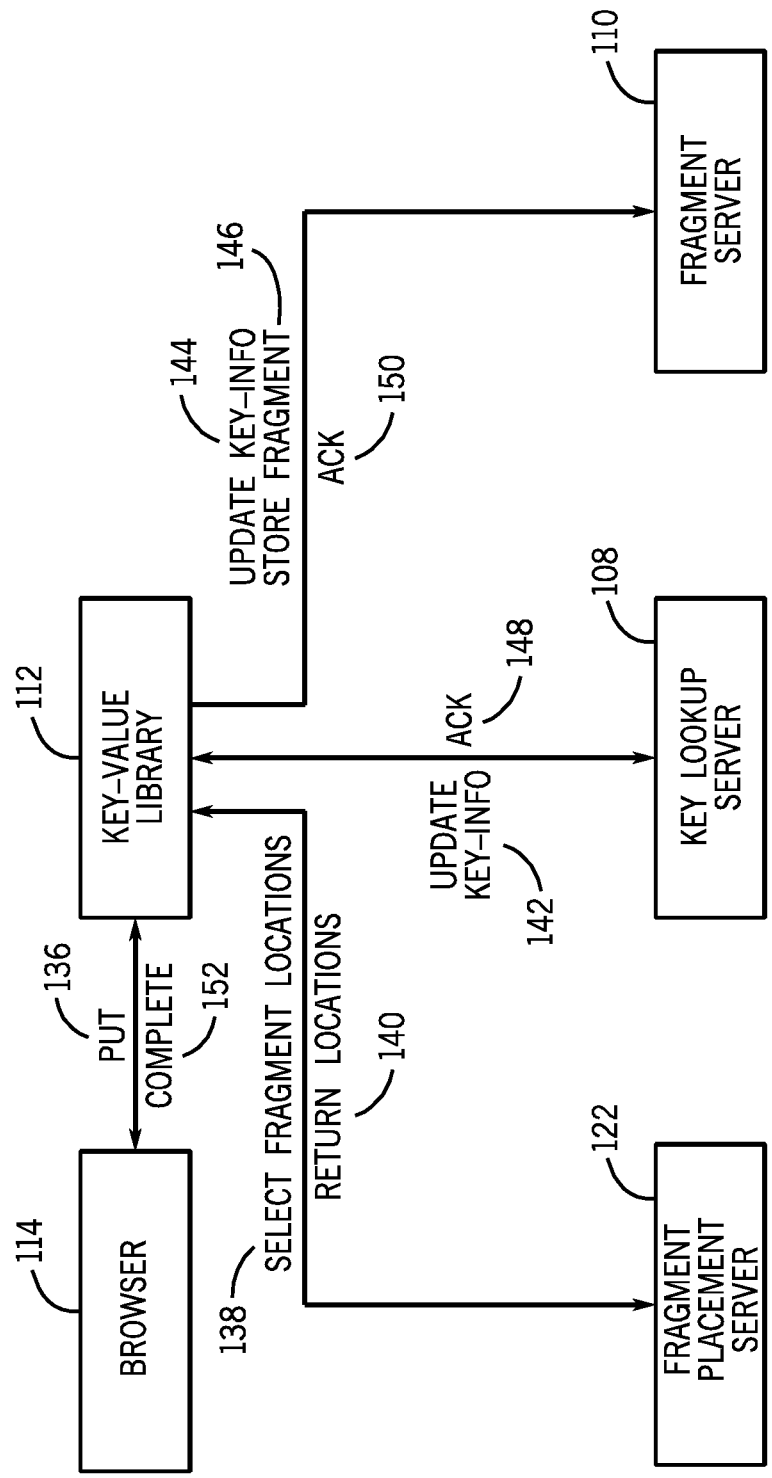
FIG. 2 is an illustration of an exemplary messaging protocol to insert values into the data storage system, in accordance with an embodiment of the invention.

For instance, in one embodiment, and with reference to the exemplary Put operation shown in FIG. 2, a request 136 from a user to insert a (key, value) pair into the KBA 100 invokes Put (key, value, rspec) via, for instance, browser 114. The user may supply the key, the value, and the rspec. The KVL 112 receives the request 136 and generates the kvt (i.e., a (local time, node ID) pair). Then, for that (key, kvt) pair, the KVL 112 sends a request 138 to the fragment placement servers 122 at each of the storage nodes 102, 104 asking for potential storage locations (i.e., fragment stores 118 on the FSs 110) for the value's fragments. The fragment placement servers 122 may reply 140 with storage location recommendations based on various parameters, such as the current load on the FSs 110 at the particular storage node 102, 104, the current amount of free storage space on the various FSs 110 at the storage node 102, 104, etc. The fragment placement server 122 for each storage node sends location information (i.e., a placement) for that storage node back to the KVL.

In other embodiments, the fragment placement servers 122 may be omitted and the KVL 112 may request locations directly from the KLSs 108. In such embodiments, each of the KLSs 108 at the storage nodes 102, 104 sends its recommendations for its own storage node back to the requesting KVL 112. For each storage node 102, 104, the KVL 112 uses only the first response that it receives to choose the locations for the responding storage node. Once a first response from a storage node is received, all other responses from that storage node are ignored. The KVL 112 then uses the rspec to select the locations at each storage node 102, 104 based on the first responses received from each storage node 102, 104. The KVL 112 may also cache locations provided on previous Put operations and reuse those locations.

Once the KVL 112 has a set of locations for a specific storage node, it sends updates 142, 144 to all of the KLSs 108 in the KBA 100 (i.e., in both storage nodes 102, 104) and the selected FSs 110 asking them to store the (key, key-info) pair, which includes the placement. If the updates are not received by either the KLSs 108 or the FSs 110 (e.g., due to a dropped message, network outage, etc.), then the convergence protocol, which will be described below, repairs the discrepancy. In one embodiment, the KVL 112 updates all the KLSs 108 and the selected FSs 110 in the KVL's storage node as soon as it receives location information from any data center. Thus, the first update may include only the locations (L1) for one of the storage nodes. When the KVL 112 receives the placement (L2) from the second storage node, it again updates all the KLSs 108 in the KBA 100 and the selected FSs 110 in both storage nodes. This time, however, the update includes both placements L1 and L2. Thus, the KLSs 108 and the selected FSs 110 may have multiple entries for a particular key.

In this exemplary embodiment, while the KVL 112 waits for the placement information, it computes the fragments that it will send to the FSs 110 based on the rspec. As soon as the KVL 112 receives a placement for a fragment, it sends the fragments to the selected FSs 110 for those fragments.

The KLSs 108 and FSs 110 acknowledge 148, 150 the receipt of the (key, key-info) updates and the new fragments to the KVL 112. When the KVL 112 knows that at least one KLS 108 has a current set of locations for a (key, key-info) pair and enough fragments have been stored stably (as determined by the rspec in the key-info), the KVL 112 provides an indication of success 152 (i.e., completeness) back to the user. The number of fragments stored before indicating success affects the reliability of the KBA 100.

Figure 3:
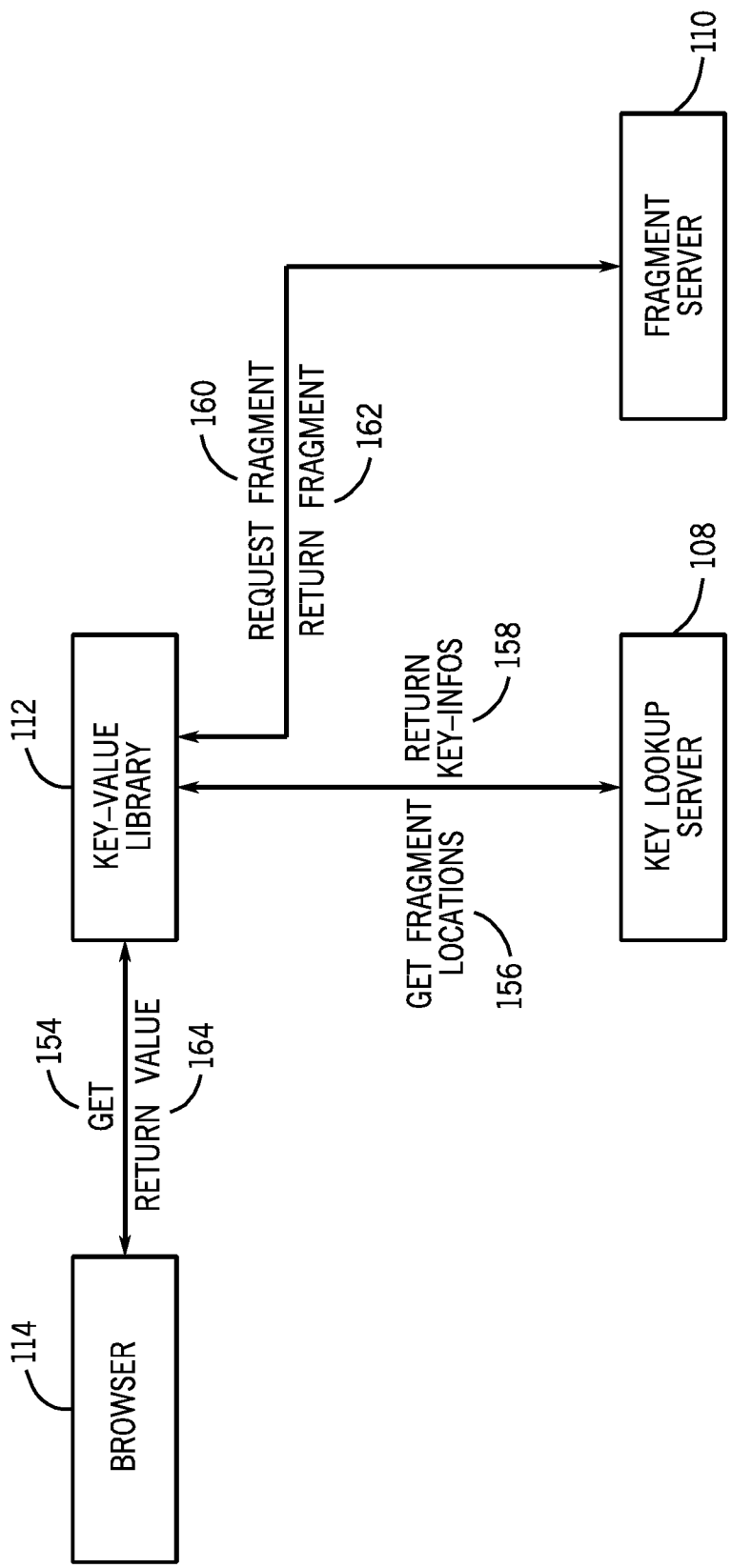
FIG. 3 is an illustration of an exemplary messaging protocol to retrieve values from the data storage system, in accordance with an embodiment of the invention.

Turning next to the Get operation, it generally operates to discover fragment locations for the requested value; retrieve fragments; try harder if either the locations cannot be discovered or the fragments cannot be retrieved; and construct the requested value from retrieved fragments. For instance, in one embodiment and with reference to FIG. 3, to discover the locations of the fragments, the KVL 112 receives a Get(key) request 154 from browser 114 and then attempts to locate the fragments for the value associated with the key by sending messages 156 to the KLSs 108. In one embodiment, the KVL 112 selects one KLS 108 and requests the locations for a given key. When the KLS 108 receives the request, it replies 158 with all of the key-info it has for that key (i.e., the KLS 108 may have multiple key-infos for a given key).

To retrieve the fragments, the KVL 112 picks the most recent locations (as indicated by the kvt in the key-infos) that can reconstruct the value and sends a request 160 for the fragments to the corresponding FSs 110. The FSs 110 return 162 the fragments if they have them. A value is considered reconstructible if the number of discovered locations is at least the number of data fragments specified in the rspec in the key-info. In one embodiment, the KVL 112 retrieves just enough fragments from the FSs 110 to recover the most recent value. If enough FSs 110 are not available such that a sufficient number of fragments cannot be retrieved, then the KVL 112 may request locations from another KLS 108 (if the KVL 112 does not already know all of the locations).

If the KVL 112 still is unable to retrieve sufficient fragments for the most recent version of the value, then the KVL 112 attempts to retrieve the value associated with an older timestamp using the same steps it used in its attempt to retrieve the most recent value. If no older timestamp exists, then the KVL 112 returns an indication of a failure. However, if a sufficient set of fragments is retrieved, then the KVL 112 reconstructs the value using error correction blocks as needed. The KVL 112 then returns 164 the value to the browser 114.

As discussed previously, the KBA 100 is implemented in a failure-prone environment. Data centers may become unavailable, servers within data centers may fail, the network may undergo temporary partitions, etc. Should any of these failure events occur or exist while a Put operation is being implemented, values may not be stored completely. Likewise, failure events that occur after values have been successfully inserted into the KBA may result in loss of some of the fragments. Accordingly, embodiments of the invention provide for a convergence protocol that repairs metadata and fragments after failures.

Referring to FIGS. 1 and 2, the KBA 100 stores metadata (e.g., the key-info) for each value in all of the KLSs 108 and data (i.e., fragments of redundantly encoded values) in selected FSs 110. Under fault-free conditions, the Put operation ensures that every KLS 108 stores the metadata for the Put, and each selected FS 110 for the (key, key-info) pair stores the appropriate fragment. If these conditions are met, then the Put operation completes at an "At Max Redundancy" (or AMR) state. However, various kinds of failures (e.g., message drops, machine crashes, disk failures, network partitions, failure of KVL 112 during a Put operation) may cause some metadata and data to be missing from their intended locations and, thus, a Put operation may not complete at AMR. As one example, assume that during a Put operation, the KVL 112 has updated all of the KLSs 108 and selected FSs 110 with metadata, but all of the fragments have not been stored. If a network partition occurs, then the missing fragments will not reach their intended locations. If the failure conditions persist, AMR can never be reached for the affected value. However, if the failure conditions do not persist, then it may be possible that a non-AMR state may be converged to an AMR state. As used herein, the process of attempting to reach AMR for a given value is referred to as convergence.

In some embodiments, to ensure that there is no central failure point, every FS 110 in the KBA 100 performs the convergence protocol independently. A convergence step runs the convergence protocol for a specific (key, key-info) pair stored at the FS 110. In one embodiment, a round of convergence involves running a convergence step for every (key, key-info) pair having a fragment stored at the FS 110 to ensure that it is at the AMR state and/or to converge it to the AMR state. An FS 110 stores the (key, key-info) pairs logically in a list or queue, such as in a convergence log 11. Although the convergence log 111 is shown separately in FIG. 1, it should be understood that the log 111 may be stored in any suitable storage device in the FS 110, such as the memory 136. Every FS 110 runs a round of convergence periodically (e.g., every minute) over all the entries in the convergence log 111. In general, convergence involves checking whether a (key, key-info) pair stored in the log 111 is at AMR and, if not, then, recovering the value associated with the key and updating the key-info as needed. An exemplary convergence step to converge a specific (key, key-info) pair is represented in the flow diagram of FIG. 4.

Figure 4:
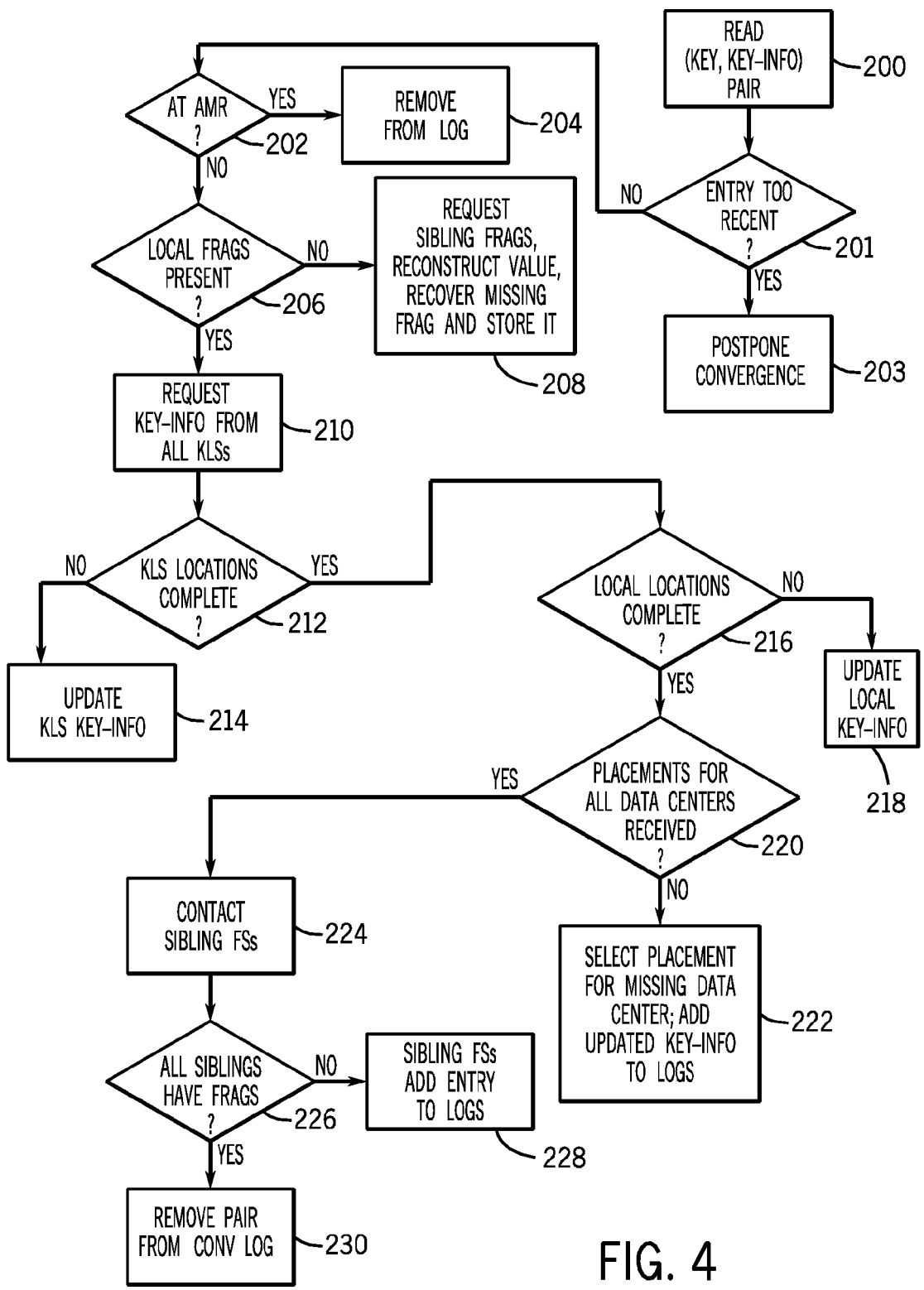
FIG. 4 is a flow diagram of an exemplary convergence technique that may be implemented in the data storage system, in accordance with an embodiment of the invention.

In FIG. 4, each of the FSs 110 run a convergence step that reads each entry in its convergence log 111 (block 200) and determines whether the stripe for that entry (i.e., all of the encoded data stored for a (key, key-info) pair) is at AMR (diamond 202). For instance, in one embodiment, the entry itself may include an indication that the (key, key-info) pair is at AMR (e.g., an AMR bit(s) may be set). If the entry is at AMR, then the entry is removed from the log 111 (block 204) and no further action is taken. In some embodiments, when the FS 110 removes the entry from its convergence log 111, it updates the key-info in a redundant key-info store 310 (see FIG. 8) to indicate that the corresponding value is at AMR. In the exemplary embodiment shown in FIG. 8, the redundant key-info store 310 is maintained on a disk 119 distinct from the fragment store 118 for which it maintains metadata.

Returning to FIG. 4, if the entry is not at AMR, then the converging FS 110 attempts to bring the (key, key-info) pair to AMR, including recovering any missing fragments if necessary. More specifically, when implementing a convergence round, a converging FS 100 starts by verifying that the local fragments for that (key, key-info) pair in the log 111 exist (i.e., are locally stored at the specified locations in that FS) (diamond 206). If a local fragment is missing, then the converging FS 110 attempts to recover it by requesting fragments from sibling FSs (i.e., FSs that should have the other fragments in the stripe for that particular value) (block 208). The converging FS 110 determines the sibling FSs from the key-info information for the key that corresponds to the requested value. If the sibling FSs return sufficient fragments, then the converging FS 110 reconstructs the original value and encodes it to obtain the fragment that it should have had and stores it in its fragment store 118. The entry corresponding to the fragment remains on the converging FS's convergence log 111 so that it will be checked for AMR during the next round of convergence. In some embodiment, the sibling FSs 110 may determine that they have the requested sibling fragments either by checking the appropriate redundant key-info store 310 or by checking the appropriate fragment store 118 directly.

If all local fragments for the value are present, then the converging FS 100 contacts all KLSs 108 in the KBA 100 for their key-info corresponding to the key (block 210). The converging FS 110 then compares its location information with the location information in the key-infos obtained from the KLSs 108. If the FS 110 determines that any of the KLSs 108 have incomplete locations (diamond 212), then the converging FS 110 may also update those KLSs 108 with the FS's locations (block 214). If a KLS 108 has more locations than the FS 110 has (diamond 216), then the FS 110 updates its key-info in its convergence log 111 to include the new locations (block 218). In this way, a converging FS 110 ensures that all KLSs 108 and the relevant FSs 110 have complete metadata so that in the next convergence round, the (key, key-info) pair may reach AMR, if possible.

In some embodiments, the converging FS 110 may also cache an indication of which KLSs 108 have the complete key-info for that (key, key-info) pair. Thus, in the next round of convergence, the converging FS 110 does not have to send requests to those KLSs 108 for their key-info, which will help speed up convergence.

Returning to the current convergence round, the converging FS 110 also ensures that a complete stripe for the (key, key-info) pair exists. Here, if the converging FS 110 has incomplete fragment locations for the stripe (diamond 220) (e.g., the FS 110 notes that neither it nor any of the KLSs 108 has a placement for a remote data center), then the converging FS 110 initiates a procedure to select locations for the fragments at the remote data center and complete the stripe (block 222). Once the placement is complete, the updated key-info with the complete placement is sent to all the KLSs 108 and the selected FSs 110 so that on the next round of convergence, the (key, key-info) pair may reach AMR, if possible.

The converging FS 110 further contacts all sibling FSs 110 (as determined from the key-info) to verify they have the corresponding fragments in their fragment stores 118 (block 224). Again, the sibling FS 110 may make this determination either by looking directly in its fragment store(s) 118 or by referring to its redundant key-info store 310. If a sibling FS 110 does not have the (key, key-info) pair (diamond 226), it adds the entry to its convergence log 111 so that the missing fragment(s) may be recovered during that FS's next round of convergence (block 228). If a message from a sibling FS 110 is received that indicates that the sibling FS 110 has its fragment(s), then the converging FS 110 may store that indication to keep track of which sibling fragments are stored correctly. For instance, in some embodiments, the converging FS 110 may include a bit for every KLS 108 and each sibling FS 110 in the metadata. If this bit is set to "1," then the converging FS 110 knows that it has already received a successful response from the KLS 108 or FS 110 in question. Again, keeping track of which fragments are properly stored may save time on subsequent convergence rounds since the converging FS 110 can omit sending messages to the sibling FSs 110 requesting their fragments.

If all of the KLSs 108 have replied with complete key-info (indicating that the stripe is complete) and all of the sibling fragments are stored by the appropriate sibling FSs 110, then the converging FS 110 knows that the (key, key-info) pair is at AMR and may drop the entry from its convergence log 111. In some embodiment, the FS 110 also may update its redundant key-info store 310 with key-info that indicates that the value is at AMR. Convergence thus eventually will bring all (key, key-info) pairs in a convergence log 111 to AMR, except for the case where no location information is ever received from one data center, and the case where insufficient fragments exist to reconstruct a value. More particularly, all KLSs 108 will eventually learn all location information because a converging FS 110 contacts all the KLSs 108. All sibling FSs 110 will learn they should have a fragment because of the contact from each converging FS 110. All FSs 110 will recover their fragments, if possible, as a result of checking whether the local fragments are present.

In some instances, the convergence protocol just described can be inefficient since it requires communication of a large number of messages and transfer of information between the various components in the KBA 100. In particular, converging a (key, key-info) pair requires communication among all fragment servers 110 holding the stripe's fragments and all KLSs 108. In some embodiments, various measures may be taken to optimize convergence in the sense that it will recover values and metadata more quickly, if possible, by avoiding needless communications and work.

For instance, the convergence protocol may be improved by implementing the convergence log 111 as a set of distinct logs rather than in a single logical double-ended list or queue. This may simplify convergence as it allows for each log to be either an append-only log or a read-only log, thus facilitating dealing with failures and concurrent accesses. In addition, this approach allows convergence to keep entries that need further convergence separate from entries that have been newly inserted into the KBA 100. Yet further, separating the entries into distinct logs may also facilitate recovery if an FS fails when running the convergence protocol since the separate logs may provide a mechanism for continuously tracking progress made during a convergence round.

In one embodiment, the convergence protocol uses four distinct logs:

active log (append-only): the Put operation appends key-info log entries to this log. In some embodiments, a scrubbing protocol may also append key-info log entries when data is found to be missing or corrupt.

previous-unconverged log (read-only): this log records all the unconverged entries from previous rounds of convergence.

to-be-converged log (read-only): for each convergence round, the convergence protocol attempts to converge every entry in this read-only log.

did-not-converge log (append-only). This temporary log contains the log entries that did not converge when they were processed from the previous-unconverged log and the to-be-converged log.

Figure 5:
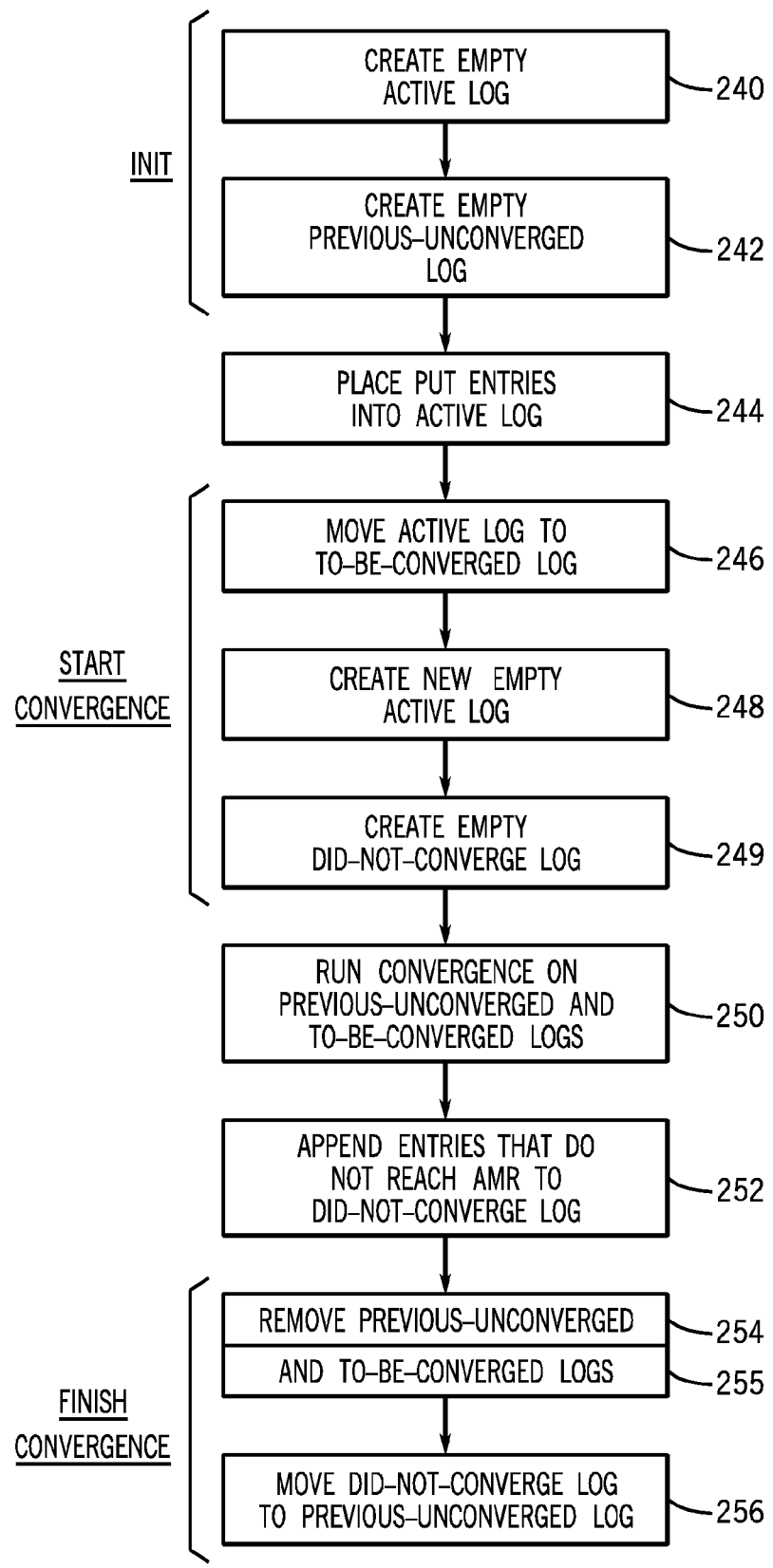
FIG. 5 illustrates an exemplary usage of logs with a convergence technique, in accordance with an embodiment of the invention.

A flow chart showing an exemplary use of the separate logs in the KBA 100 is illustrated in FIG. 5. During initialization (INIT), an empty active log (step 240) and an empty previous-unconverged log (step 242) are created. When the KBA 100 processes requests, entries are placed into the active log as a result of Put operations (step 244). Processing of requests may be performed continuously, even when an FS is running convergence. When the first round of convergence starts, the active log is moved to the to-be-converged log (step 246) and a new empty active log is created (step 248) into which Puts (or scrubs) may place entries while the convergence round is running In addition, an empty did-not-converge log is created (step 249). Convergence is performed on the previous-unconverged log entries (if any) and the to-be-converged log entries (step 250). If an entry from either the previous-unconverged or to-be-converged log is not converged during the convergence round (i.e., it does not reach AMR), then it is appended to the did-not-converge log (step 252). When the convergence round is completed, the previous-unconverged and to-be-converged logs are removed (steps 254 and 255), and the did-not-converge log is moved to the previous-unconverged log (step 256)

As mentioned above, the implementation of the logs assists restart and recovery in the event an FS 110 fails during convergence and then restarts. Upon restart, the FS 110 determines its recovery actions based on which logs are still present. For instance, if no logs are present, then the FS 110 starts over with initialization (i.e., at step 240). However, if the active log is present, then the FS 110 starts at step 242. The FS 110 can then start processing Put and Get requests (step 244). Convergence is not restarted.

If, after failure and recovery of the FS 110, the active and previous-unconverged logs are present, then no recovery is necessary. The FS 110 can begin processing requests. Convergence is not restarted.

If the previous-unconverged and to-be-converged logs are still present after recovery, then the FS 110 starts at step 248. The FS 110 can process requests and convergence can restart processing entries. If the active, previous-unconverged, and to-be-converged logs are present, then the FS 110 starts at step 249. The FS 110 can start processing requests and convergence can restart processing entries. If the active, previous-unconverged, to-be-converged, and did-not-converge logs are all present, then the did-not-converge log is deleted. The FS 110 can start processing requests and convergence can restart processing entries. However, deleting the did-not-converge log means that convergence, after restarting, may redo work that had been completed before the failure. Nonetheless, efficiencies are gained over maintaining a single list of entries which, in every instance, would require restarting convergence from the initial step.

If the active, to-be-converged, and did-not-converge logs are present, then the FS starts at step 255. Then, the FS can start processing requests. Convergence is complete and, thus, is not immediately restarted. If the active and did-not-converge logs are present, then the FS 110 starts at step 256. The FS 110 can then start processing requests. Again, convergence is complete and, thus, is not restarted immediately.

In addition to, or in lieu of, the log structure discussed above, another optimization measure that may be taken is to avoid re-checking (key, key-info) pairs that have already reached AMR. Thus, only newly stored fragments and fragments that did not reach AMR in a previous convergence round need to be checked. In one embodiment, to keep track of these fragments, each FS may maintain a list or log of only those (key, key-info) pairs that are not at AMR rather than a complete list of all pairs. Thus, convergence will be run only on those pairs that are not at AMR. This log may be a single log, may be one or more of the logs discussed above (e.g., the to-be-converged and/or did-not-converge logs), or may have other structures that may be appropriate to keep track of only those fragments that are not at AMR.

In some embodiments, to further increase the efficiency of the convergence protocol, the log (e.g., either a complete log of all entries or a log or logs limited to entries that are not at AMR) may be collapsed by merging entries that correspond to the same (key, kvt) pair. For instance, the Put operation may insert multiple entries into the log due to the fact that the KLS 108 updates the metadata at the FSs 110 as soon as it selects location information. That is, once locations are received from a first data center, a set L1 of those locations are provided to the selected FSs 110. Then, when further locations L2 are received from the second storage node, the KVL 108 updates the metadata in the selected FSs 110 by sending both the L1 and L2 locations. Accordingly, at least some of the selected FSs 110 may have two (or more) entries that correspond to a particular (key, key-info): a first entry having locations L1 and a second entry having locations L1 and L2. Since these entries are effectively duplicates for a particular (key, key-info) pair, convergence can be run on only one of the entries.

Duplicate entries also may result from an update from the KVL 112 to the FSs 110 storing the various fragments for a stripe that a Put operation has been successful (and, thus, the (key, key-info) pair is at AMR). More specifically, in the general case, newly stored fragments from recent Put operations are not likely to experience any failures. Thus, in one embodiment, to avoid sending convergence messages for these fragments, the Put protocol may include a message each sibling FS 110 indicating that it has successfully stored its fragment. In addition, responses may be sent from each of the sibling FSs 110 and all of the KLSs 108 indicating that they have successfully received/updated the key-info. Once the KVL 112 receives all of the confirmations for a stripe, the KVL 112 sends a message to all relevant FSs 110 indicating that the Put has been successful and, thus, that the value is at AMR. The receiving FSs 110 insert this indication of AMR for the (key, key-info) pair into their respective logs by, for example, appending an entry for the pair with specific bit(s) set to indicate the AMR state. The KLSs 108 that received the "at AMR" indication from the KVL 112 may update their key-info entry by, for example, setting specific bit(s) to indicate the AMR state.

Thus, in one embodiment of convergence, to avoid needlessly running convergence on duplicate entries in the convergence log 111 (e.g., duplication which may occur due to log updates and AMR indications), each FS 110 first looks at all of the entries in the convergence log 111, determines which entries correspond to the same key, and then merges the entries so that only one entry for each key is considered during convergence. As a result, the size of the log 111 is collapsed and, in some embodiments, may be reduced to only those entries that are not at AMR.

In practice, considering the entire log of entries may be constrained by the availability of memory. However, since entries are added to the convergence log 111 in order of occurrence, duplicate entries are likely to be in close proximity (e.g., within a hundred or so entries). Accordingly, the collapsing of the convergence log 111 may be implemented by considering only finite sections of the log 111 at a time. In one embodiment, a fixed-size sliding window that is implemented using a rotating hash map is used to bound the section of the log 111 that is currently under consideration. However, other appropriate techniques also are contemplated for restricting the number of log entries that are considered at any one time. In general, when using the sliding window, the convergence protocol merges entries earlier than (or before) the current window with entries in the window that refer to the same stripe. Earlier entries that have no matches in the current window are scheduled for convergence. Convergence for earlier entries that do have a match is postponed.

Figure 6:
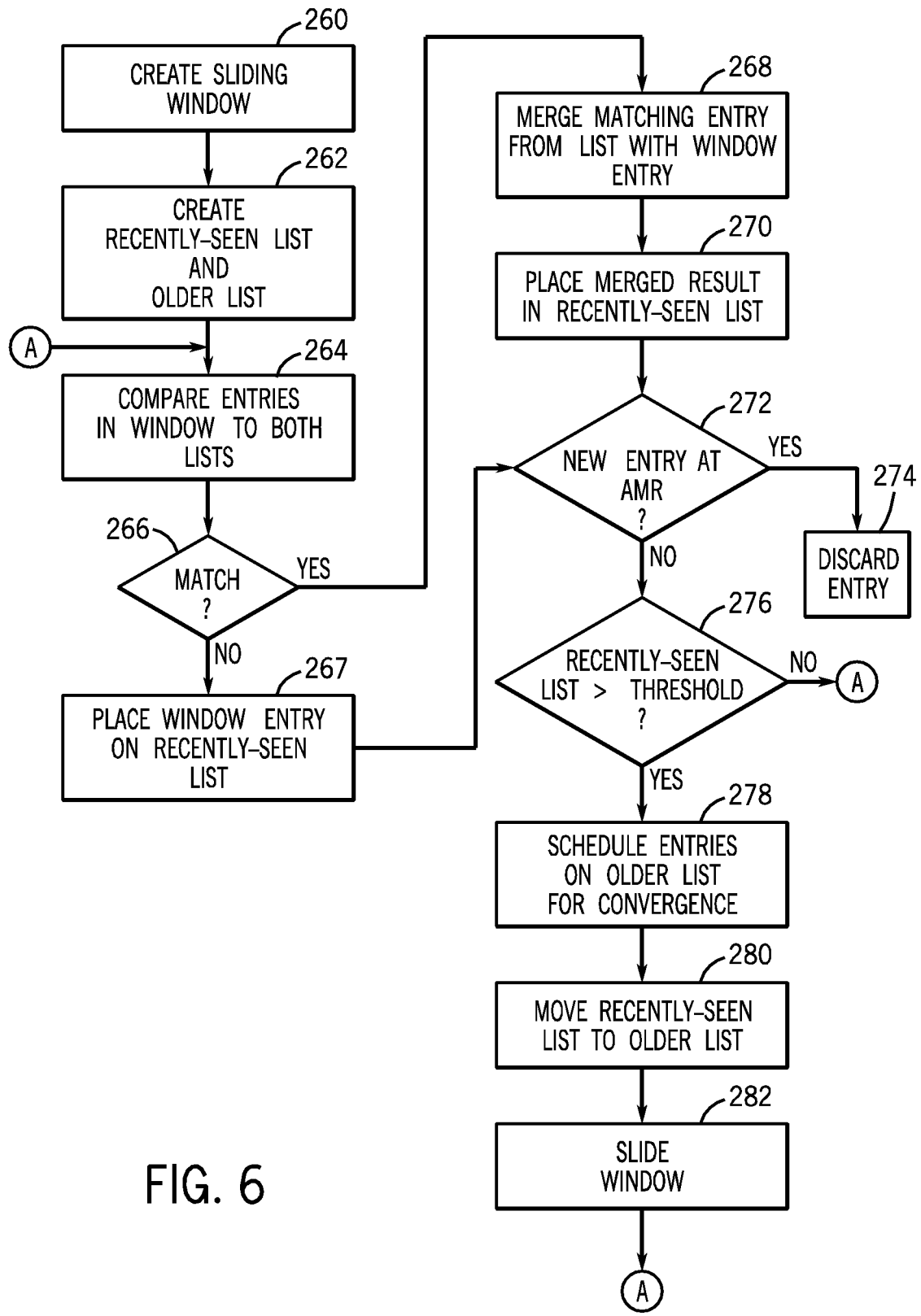
FIG. 6 is a flow diagram of an exemplary collapsing technique that may be implemented in the data storage system, in accordance with an embodiment of the invention.

A flow diagram of an exemplary collapsing technique is illustrated in FIG. 6. First, the sliding window is created or defined and used to bound the portion of the convergence log 111 that will be considered at one time (block 260). Then, as convergence scans through the log 111, it maintains two sets of entries in memory: a recently-seen set of entries and an older set of entries (block 262). When the convergence protocol reads a new entry from the window, it checks both the recent set of entries and the older set of entries for a previously existing entry that corresponds to the same key (block 264). If there is no match (diamond 266), then the entry is placed on the previously-seen list (step 267). Otherwise, if an entry already exists in one of previously-seen or older sets, convergence removes it from the corresponding set and merges the metadata of the newly read entry from the log with the entry in the window (block 268). This merging may be implemented by taking the most recent timestamp (i.e., from the key-info) of the two entries and merging the placement information. The merged result is then inserted into the recently-seen set of entries (block 270). If this new entry is an AMR indication (diamond 272), then the new entry is discarded (block 274). Once the recently-seen set of entries reaches a threshold size, the fragments referenced in the older set are scheduled for convergence (block 278), and the recently-seen set is moved to the older set (and the recently-seen set becomes empty) (block 280). The sliding window is then moved to the next portion of the log 111 and the collapsing protocol continues at step 264. In one embodiment, the threshold size for the recently-seen list is the size of the sliding window.

The sliding window technique may be implemented regardless of the type of convergence log or logs used. For instance, the convergence log may be a single log or may have a multiple log structure, such as the four-log structure discussed above. In the latter case, the collapsing technique may be performed on only the to-be-converged log prior to attempting convergence.

In yet further embodiments, convergence may be optimized by storing information about which components in the KBA 100 are aware of which information. This optimization may speed up convergence in instances in which the convergence did not successfully reach AMR because one of the contacted parties (i.e., a sibling FS 110 or a KLS 108) was unreachable due to a network outage. As an example, two servers may be able to reach a common third server, but cannot communicate with one another. To address this situation, the metadata associated with each value may include information indicating which FSs 110 have their intended fragment and which KLSs 108 have the complete location information for a stripe. The KLSs 108 cache this metadata for each (key, key-info) pair along with whether that pair has reached AMR. Thus, in the event of network instability, when multiple FSs 110 are converging the same stripe, the FSs 110 may discover through the KLSs 108 the information that the sibling FSs 110 have rather than relying on direct contact with the sibling FSs 110 themselves.

As discussed previously, each FS 110 periodically runs convergence, such as at intervals of one minute. Due to the short time interval, it is possible that a Put operation may be in progress. To avoid running convergence on entries for which the Put operation has not completed, and as shown in the flow diagram of FIG. 4, the FS 110 may be configured to postpone convergence entries that are too young (e.g., less than five minutes old) (diamond 210 and block 203). The FS 110 may determine that the entry is too young by checking the kvt parameter in the key-info. Again, this technique helps optimize convergence because it avoids needless work.

A further optimization to determining whether a (key, key-info) pair is at AMR is to allow the FSs 110 to logically deduce AMR rather than directly communicate with the KLSs 108 and other FSs 110 in the KBA 100. For instance, if any communication with a server results in an FS 110 learning that a particular (key, key-info) pair is at AMR, then the communicating FS 110 will update its (key, key-info) pair entry to likewise indicate that it is at AMR. In some embodiments, any FS 110 that has learned or determined that a particular (key, key-info) pair is at AMR may push out messages to the KLSs 108 and the sibling FSs 110 to inform them that they should append to their convergence logs 111 a (key, key-info) pair entry having an indication that the value is at AMR. As a result, when those FSs 110 run a convergence round, a convergence step need not be performed on those entries and they may be dropped from the convergence log 111.

In addition to checking for AMR and recovering entries in an FS's log, the convergence protocol drives recovery of missing sibling fragments. Specifically, as discussed above, when a sibling FS 110 receives a message from a converging FS 110 for a fragment that it should have and the sibling FS 110 does not have that fragment, then the sibling FS 110 adds that key-info entry to its list of entries that require convergence (e.g., the active log). This ensures that a convergence step will be run in the next round of convergence and the missing fragment will be recovered, if possible. This is because the first action that a converging FS 110 takes during a convergence step for a log entry is to ensure that it stores the fragment and recover it if necessary.

Other optimizations for recovering missing fragments also are possible. For instance, in one failure scenario, a network partition during a Put operation can prevent a value from reaching AMR. To further complicate matters, during a network partition, the KLSs 108 on the remote side of the partition cannot be reached. As a result, the Put operation cannot choose fragment locations for the remote side of the partition. However, it is possible that enough fragments may have reached fragment servers in the local storage node so that the value corresponding to the fragments can be recovered. Thus, in some embodiments, convergence may be optimized so that the convergence protocol finishes the portion of the Put operation that did not complete due to the partition. Specifically, the convergence protocol may be augmented so that a converging FS 110 chooses fragment locations for the remote side of the partition after the partition heals.

In this situation, without further controls, it is possible that multiple converging FSs 110 at the local storage node 102 will attempt to select the fragment locations for the remote storage node 104. Thus, multiple fragment locations could end up storing replicas of the same fragment. To prevent this replication, one KLS 108 in each storage node 102, 104 may be designated as a primary KLS. Thus, all converging FSs 110 send requests to select fragment locations to the primary KLS 108, which then decides the placement for the fragments at the remote storage node 104 in accordance with the redundancy information (rspec) in the key-info. The primary KLS 108 also updates the key-info with the new placement. Thus, during the next convergence round, a converging FS 110 will discover the new placement when it contacts the KLSs 108 and then propagate this information to the sibling FSs 110 so that they can run convergence steps to recover the appropriate fragments.

In some embodiments, a secondary KLS 108 is designated in each storage node 102, 104. Thus, in the event a primary KLS 108 is unreachable, a request for fragment locations will be sent to the secondary KLS 108. In yet other embodiments, the KLSs 108 in each storage node may decide amongst themselves which KLS 108 shall handle fragment location requests.

Because each FS 110 runs the convergence protocol independently, each sibling FS 110 at the remote storage node 104 will attempt to recover its fragment independently. As a result, the same set of fragments for a stripe may be repeatedly pulled across the network between storage nodes. In some embodiments, to avoid unnecessary repetitive work, a single FS 110 in the remote storage node 104 may be designated to do the work of pulling the fragments for the stripe, reconstructing the value, encoding the value, and then recovering each fragment to be stored on the selected FSs 110 at the remote storage node 104. The single FS 110 may be designated by the primary KLS 108 when it generates the placement for the stripe. Alternatively, an FS 110 in the local storage node 102 may designate a remote FS 110 to perform the recovery. In either case, the other remote FSs 110 are prevented from starting recovery until the designated FS 110 completes recovery. For instance, a time delay (e.g., five minutes) may be imposed before the other remote FSs 110 can start recovery, or the other remote FSs 110 may not be provided with updated key-info by the primary KLS 108 until the designated FS 110 completes recovery.

Figure 7:
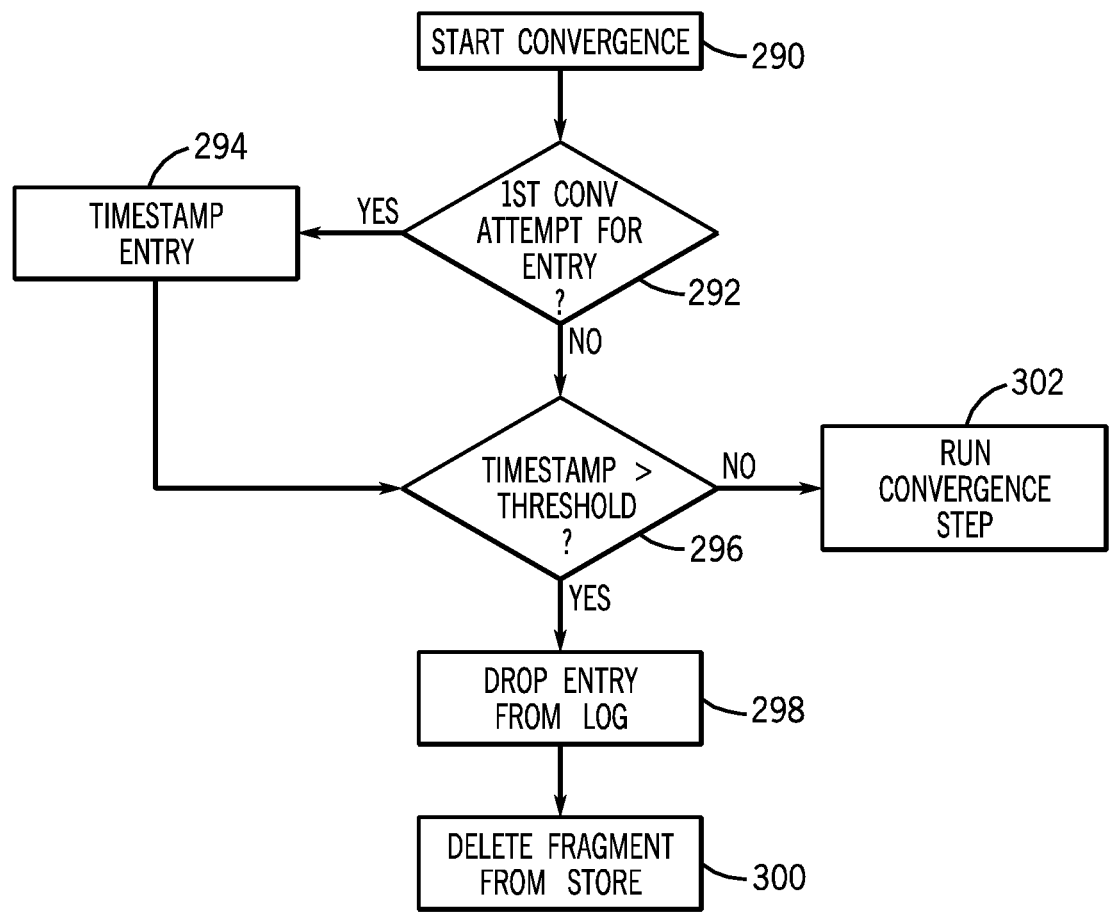
FIG. 7 is a flow diagram of an exemplary abandonment technique that may be implemented in the data storage system, in accordance with an embodiment of the invention.

In some embodiments, the convergence protocol may also include an abandonment operation for further preventing the implementation of useless tasks. In general, the abandonment protocol deletes log entries that will never reach AMR. As an example, assume a Put operation fails before enough fragments are stored to be able to recover a value. Because some of the servers may include entries corresponding to the key, a converging FS will repeatedly attempt to bring the entry to the AMR state by continuing to request fragments from sibling FSs. However, the sibling FSs never return the fragments. Thus, in one embodiment, the FS keeps track of how long it has been attempting to converge each (key, key-info) pair. For instance, as shown in the flow diagram of FIG. 7, when a convergence round starts (block 290), the converging FS 110 determines whether it is the first time a convergence step has been run on the (key, key-info) pair (diamond 292). If so, the FS 110 timestamps the entry and continues running the convergence step (diamond 296, block 302). However, if it is not the first convergence attempt on that entry, and the timestamp exceeds a threshold (e.g., is days old, a months old, etc.)

(diamond 296), then the FS 110 drops the entry from the log (block 298) and deletes the corresponding fragment from its store (block 300). If the timestamp does not exceed the threshold, then the FS continues running the convergence step (block 302).

It should be understood that the convergence protocol may be implemented without any of the optimization techniques described herein. It should further be understood that if an optimization is used, the various optimization techniques are not necessarily dependent on the others. Thus, various combinations of optimization techniques may be implemented. Yet further, the selection of a particular optimization technique may depend on the particular application in which the KBA 100 is implemented. In addition, tracking of (key, key-info) pairs that are at AMR or that need to be converged may be performed in manners other than the specific log structures discussed above. For instance, more, fewer, or different combinations of logs may be used by each of the FSs 110 depending on the particular application in which convergence is being implemented and the policies of that implementation.

Convergence brings values to the AMR state, if possible. Once a value reaches AMR, it is removed from the fragment servers' convergence logs. Thus, if a failure event occurs after the value has reached AMR, then it is possible that various fragments may be lost or become corrupted such that the value no longer is at AMR. Since a corresponding convergence log entry no longer exists, the convergence protocol cannot recover the value.

Accordingly, some embodiments of the KBA 100 also include a scrubbing protocol that is run periodically (e.g., every two weeks) to ensure that values may re-achieve AMR after failures. In general, each FS 110 server independently runs the scrubbing protocol to verify that all local information, including both locally stored fragments and locally stored metadata, is present and readable. If any local information is not correct or is missing, then an entry is added to the fragment server's convergence log 111 so that the convergence protocol will repair the information, if possible, and converge the value back to AMR.

In addition, in accordance with one embodiment of the invention, a scrubbing FS 110 may also contact one or more sibling FSs 110 in the KBA 100 to remind those FSs 110 that they should have sibling fragments. If a sibling FS 110 does not have the expected information, then it adds an entry to its convergence log 111 so that convergence can repair the information, if possible. The scrubbing FS 110 may further contact one or more KLSs 108 in the KBA 100 to determine whether the FS 110 is scrubbing a fragment that corresponds to the latest version of a value. If a later version exists and is at AMR, then the fragment can be removed from the FS's fragment store 118. Thus, the scrubbing protocol discovers problems with information that was once at AMR and provides for recovery and return to AMR through the convergence protocol. In addition, the scrubbing protocol is implemented efficiently in the sense that it does not waste efforts attempting to repair older versions of information when there is a newer version that has achieved AMR. Yet further, the scrubbing protocol can lead to reclamation of storage space in the KBA 110 since it provides a technique for discovering and purging old versions of information, if desired.

Figure 8:
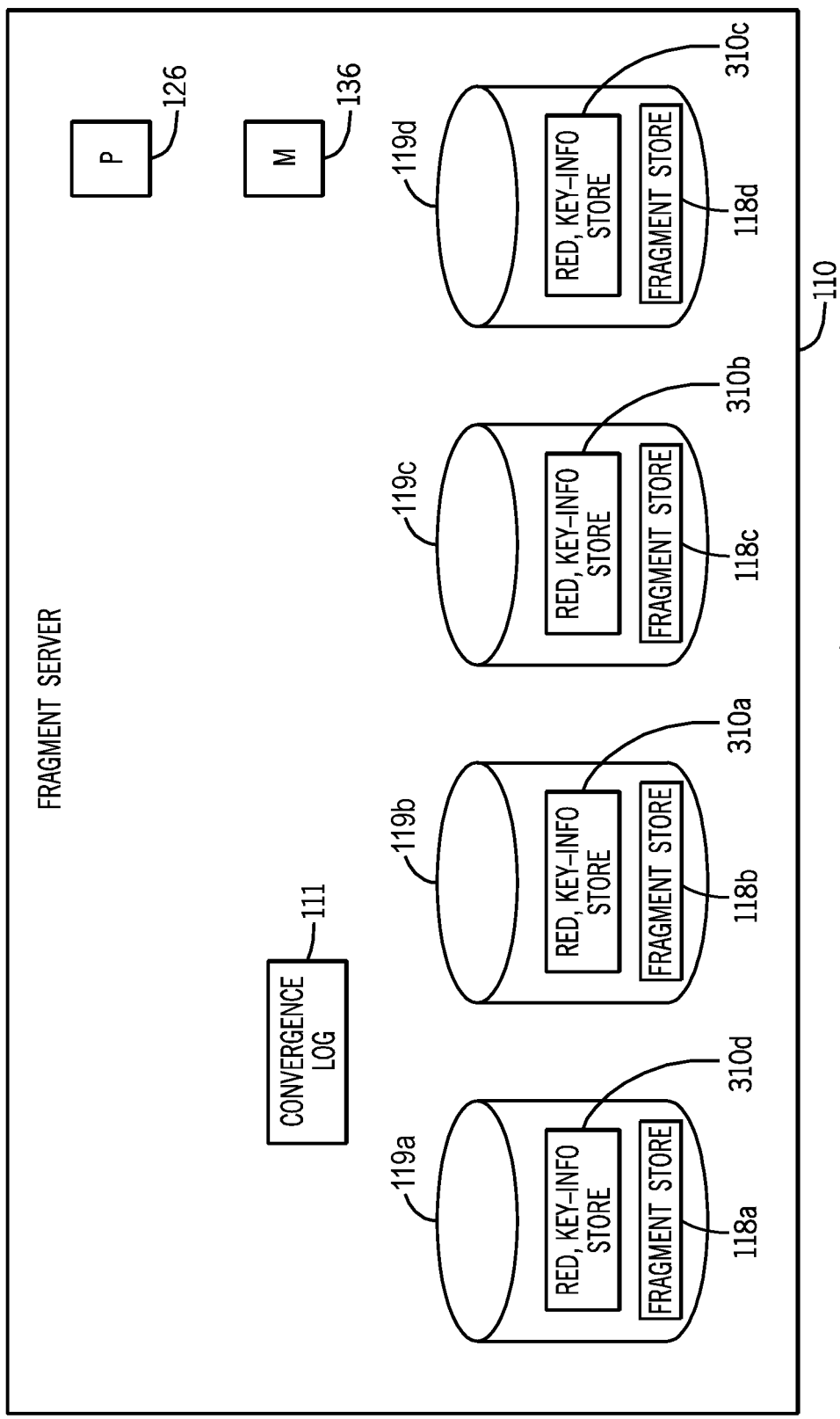
FIG. 8 is a block diagram of an exemplary fragment server that may be used in the data storage system, in accordance with an embodiment of the invention.

In one embodiment, and as shown in the block diagram of an exemplary FS 110 in FIG. 8, the scrubbing protocol is facilitated by the use of redundant key-info stores 310 in the fragment stores 118 which maintain (key, key-info) mapping for fragments. In this embodiment, when a value reaches the AMR state (e.g., through convergence), each FS 110 storing fragments for the stripe records a (key, key-info) pair entry into the redundant key-info store 310 associated with the fragment store 118 for each fragment. To enhance the robustness of the scrubbing protocol, and as shown in the exemplary embodiment of FIG. 8, the redundant key-info store 310 is implemented on a fragment store 118 other than the fragment store 118 on which the corresponding fragments are stored. As an example, if a fragment server 110 has four disks 119a, 119b, 119c, 119d with fragment stores 118a, 118b, 118c, 118d, respectively, then the disk 119b storing fragment store 118b may store the redundant key-info store 310a for the fragments that are stored in fragment store 118a; disk 119c may store the redundant key-info store 310b for the fragments stored in fragment store 118b; etc. Thus, when each of the fragment servers 110 for a stripe determines during convergence that a value has achieved the AMR state, each fragment server 110 adds the (key, key-info) pair to the appropriate redundant key-info store 310 for its fragment. In this manner, in the event of a disk failure, there is a greater likelihood that either the fragment or the key-info corresponding to the fragment will still exist and, thus, that missing information may be recovered.

Figure 9:
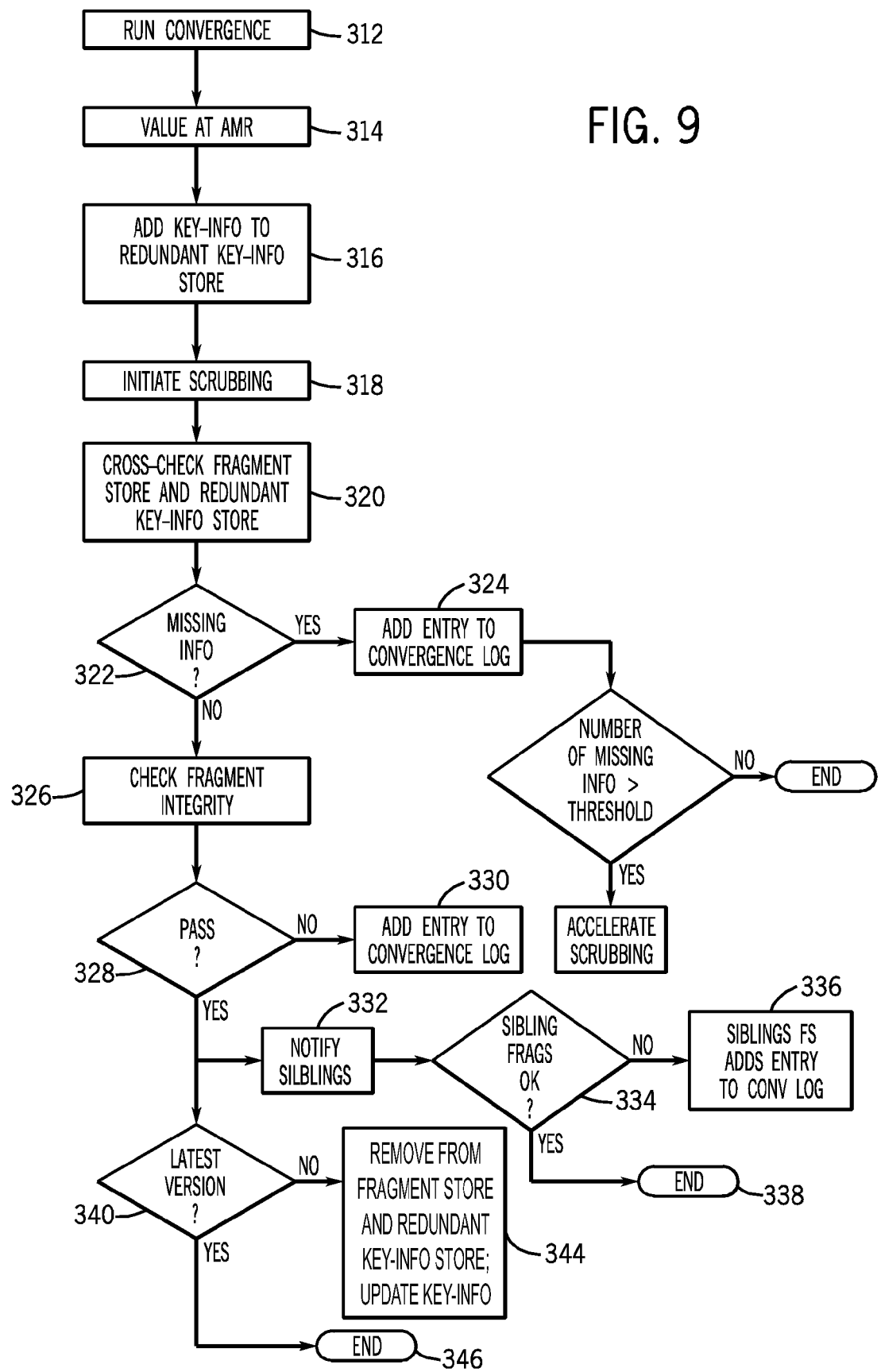
FIG. 9 is a flow diagram of an exemplary scrubbing technique that may be implemented in the data storage system, in accordance with an embodiment of the invention.

A flow diagram of an exemplary scrubbing protocol is shown in FIG. 9. In this example, it is assumed that values have been Put into the KBA 100, convergence rounds have been run (block 312), values have achieved the AMR state (block 314), and the converging FSs 110 have placed (key, key-info) pair entries for the fragments in the converged stripes into the appropriate redundant key-info stores 310 (block 316). Then, at step 318, a fragment server 110 initiates the scrubbing protocol at an appropriate time (e.g. after a period of two weeks).

As part of the scrubbing protocol, the FS 110 performs a cross-check (block 320) where it verifies that every fragment in each of its fragment stores 118a-d has corresponding entries in the appropriate redundant key-info stores 310a-d. Similarly, the FS 110 verifies that every (key, key-info) pair entry in the redundant key-info stores 310a-d has a corresponding fragment in the appropriate fragment stores 118a-d. If either fragments or key-info is missing (diamond 322), then the FS 110 adds a (key, key-info) pair entry to its convergence log 111 so that the information can be repaired during convergence, if possible (block 324). If, however, the cross-check indicates that the fragments are present and the redundant key-info store has complete information (diamond 322), then the FS 110 checks the integrity of the stored fragments (block 326). For instance, in one embodiment, the FS 110 determines whether the stored fragment can be read from the fragment store 118 and verified against the fragment hash or checksum in the header for that fragment. If the FS 110 determines that the integrity of the fragment is compromised (diamond 328), then the FS 110 adds a (key, key-info) pair entry to its convergence log 111 so that the fragment can be recovered during convergence (block 330).

If the cross-check is successful (diamond 322) and the fragment can be read and verified (diamond 328), then the FS 110 contacts one or more of its sibling FSs 110 (i.e., FSs that have fragments in the same stripe) to remind the contacted FS(s) 110 that they should have fragments for that (key, key-info) pair (block 332). Upon receipt of this reminder, a sibling FS 110 verifies that its fragment for the stripe can be read from its fragment store 118, that it passes the integrity check, and that its header information matches the header information in the message (diamond 334). If not, then the sibling FS adds an entry to its convergence log 111 (block 336). If the fragment passes the check, then the sibling FS takes no further action since none is needed (block 338).

In one embodiment, the scrubbing FS 110 contacts only the sibling FS 110 that has the sibling fragment that is next to the current fragment. In other embodiments, rather than contacting only the next FS 110, the scrubbing FS 110 broadcasts a message to all FSs 110 that should have a sibling fragment. As yet another alternative, the scrubbing FS 110 may send a message to a subset of the sibling FSs 110. Regardless of the methodology used, if a sibling FS 110 is missing its fragment, it will eventually learn so through the scrubbing protocol.

The scrubbing FS 110 also determines whether the fragment being scrubbed corresponds to the latest value for the key that is at AMR (diamond 340). To do this, the scrubbing FS 110 may contact at least a subset of the KLSs 108 in the KBA 100. When contacted by the scrubbing FS 110, a KLS 108 searches its local key-info store 120 to see if it has more recent key-info for the key and whether the more recent key-info indicates that the value is at AMR. If the KLS 108 finds more recent key-info, then it returns the new key-info to the scrubbing FS 110. Because the scrubbing FS 110 now knows that the current fragment is an old version, the scrubbing FS 110 may then terminate further consideration of the fragment. In addition, the FS 110 may delete the fragment from the fragment store 118 and the key-info from the redundant key lookup store 310 (block 344). If, however, the current fragment is the most recent version, then the scrubbing FS 110 takes no further action (block 346).

In some embodiments, the scrubbing FS 110 may contact only a subset of the KLSs 108 when verifying that the fragment is the most recent version. For instance, the KLSs 108 in the KBA 100 may be divided into equal-length ranges based on the number of fragments in the stripe. For example, if there are four KLSs 108 in the KBA 100 and two fragments, then the range of KLSs 108 for fragment 0 is {0,1} and the range of KLSs 108 for fragment 1 is {2,3}. The scrubbing FS 110 then contacts only the KLSs 108 that are in the range for that fragment. In other embodiments, the number of KLSs 108 that are contacted may be determined in a different manner depending on the policies that are implemented in the KBA 100.

As compared to convergence, scrubbing is run relatively infrequently (e.g., every two weeks). Also, since it is intended to run in the background, once scrubbing is initiated, it runs for a short period of time (e.g., a few minutes) and then stops for a period of time before resuming Accordingly, the scrubbing protocol's recovery of information occurs relatively slowly. When an entire server, store or disk fails or is replaced in the KBA 100, this low rate of recovery may not be desirable. Accordingly, in some embodiments, the scrubbing protocol may run in an accelerated mode in which missing or corrupt information is recovered more quickly. For instance, returning to the flow diagram of FIG. 9, if the cross-check reveals either that the redundant key-info store 310 is missing more than a threshold number of entries (e.g., 10 entries) or the fragment store 118 is missing more that a threshold number of fragments (e.g., 10 fragments), then this may be an indication that a serious failure event, such as the loss of an entire disk, has occurred (diamond 348). Accordingly, an accelerated scrubbing mode may be initiated in which the scrubbing protocol is run for a longer period of time, such as until the entire disk is recovered, if possible (block 350). In some embodiment, the accelerated mode may be an option that is available to a system administrator such that accelerated scrubbing may be initiated whenever desired.

Because the scrubbing protocol checks whether the current fragment is the most recent version, the scrubbing protocol also functions to purge stale data from the KBA 100. As discussed previously, the keys for the (key, value) pairs stored in the KBA 100 are not necessarily unique. Thus, it is possible to insert multiple values into the KBA 100 for any given key. The values associated with the same key are versioned (or ordered) by the key-value timestamps (i.e., kvt) at which they are Put. When the KBA 100 is asked to Get a value associated with a given key, the Get protocol ensures that the KBA 100 generally will make a best effort to retrieve the latest version. In some instances, if a later version cannot be retrieved, the KBA 100 will return an earlier version. However, if a later version has achieved AMR, then subsequent Get requests will return the later version. Hence, there may be no need to maintain earlier versions. Accordingly, to make efficient use of storage space in the KBA 100, the KBA 100 may periodically remove prior value versions if it determines that there is a later version that has achieved AMR. This process is referred to as "purging" and, in some embodiments, may be performed automatically as part of the scrubbing protocol (i.e., steps 340, 342, 344). In other embodiments, purging may be an optional feature and, thus, although a scrubbing FS 110 may not continue scrubbing an old version of a fragment, it does not delete it from the fragment store 118 or the redundant key lookup store 310.

Instructions of software described above (including the messaging protocol, the convergence protocol and/or any of the techniques shown in the figures) are loaded for execution on a processor (such as one or more CPUs 124, 126, 128, 130 in FIG. 1). The processor may include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data, data structures, and instructions (of the software) are stored in respective storage devices, which are implemented as one or more computer-readable or computer-usable storage media (such as one or more memories 120, 132, 134, 136 in FIG. 1). The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the data, data structures and instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of scrubbing information stored in a data storage system, comprising:
maintaining on a first storage device a list of metadata entries corresponding to values that are stored in the data storage system at an At Maximum Redundancy (AMR) state, where each of the values is divided into encoded fragments;
verifying that the encoded fragments corresponding to each of the metadata entries are stored on a second storage device;
verifying that a corresponding metadata entry is stored on the first storage device for each of the encoded fragments that are stored on the second storage device; and
scheduling for recovery any missing encoded fragments and/or any missing metadata entry.

2. The method as recited in claim 1, wherein the scheduling for recovery comprises appending an entry corresponding to the missing fragment and/or missing metadata entry to a convergence log, and converging entries on the convergence log to the AMR state.

3. The method as recited in claim 1, further comprising:
determining whether each encoded fragment stored on the second storage device is a most recent version; and
removing from the second storage device any encoded fragment that is not the most recent version.

4. The method as recited in claim 1, further comprising determining whether a number of missing encoded fragments exceeds a threshold value, and, if so, accelerating recovery of the missing encoded fragments.

5. The method as recited in claim 1, wherein the first and second storage devices are at a first storage location, and further comprising determining whether sibling fragments should be stored at a second storage location and, if so, transmitting a communication from the first storage location to the second storage location to cause the second storage location to verify that the sibling fragments are stored at the second storage location.

6. The method of claim 1, wherein each of the metadata entries contains information specifying a number of encoded fragments to break a value into.

7. The method of claim 6, wherein each of the metadata entries further contains information specifying a number of parity fragments to store at a corresponding storage node, where the parity fragments are used to rebuild an encoded fragment.

8. A method of scrubbing information stored as a plurality of encoded fragments across a plurality of storage nodes, comprising:
verifying, at a first storage node, that a plurality of encoded fragments associated with a plurality of values is stored at the first storage node;
scheduling any missing fragments for recovery by the first storage node;
transmitting a communication from the first storage node to a second storage node if the second storage node should have an encoded fragment that is a sibling of an encoded fragment stored at the first storage node;
in response to the communication, verifying, at the second storage node, that the sibling fragment is stored at the second storage node; and
if not, scheduling the sibling fragment for recovery by the second storage node.

9. The method as recited in claim 8, wherein metadata associated with the encoded fragments is stored at the first storage node, and wherein the verifying at the first storage node comprises cross-checking the stored encoded fragments against the stored metadata.

10. The method as recited in claim 9, further comprising storing the plurality of encoded fragments on a first storage device at the first storage node, and storing the metadata on a second storage device at the first storage node.

11. The method of claim 10, wherein the metadata includes a plurality of metadata entries, and wherein the cross-checking comprises:
verifying that the encoded fragments corresponding to each of the metadata entries on the second storage device are stored on the first storage device; and
verifying that a corresponding metadata entry is stored on the second storage device for each of the encoded fragments stored on the first storage device.

12. The method as recited in claim 9, wherein the cross-checking comprises determining whether either a number of missing fragments or a number of missing metadata exceeds a threshold value, and, if so, accelerating recovery of the missing fragments and/or the missing metadata.

13. The method of claim 9, wherein each of the values is divided into respective encoded fragments, and wherein the metadata specifies a number of encoded fragments that each of the values is to be divided into.

14. The method as recited in claim 8, further comprising:
determining whether the encoded fragments are a most recent version; and
deleting any encoded fragments that are not the most recent version.

15. The method as recited in claim 8, wherein the scheduling of recovery by the first storage node comprises appending to a convergence log at the first storage node an entry corresponding to each missing fragment; and converging, at the first storage node, the entries on the convergence log to an At Maximum Redundancy (AMR) state.

16. A data storage system, comprising:
a local storage node; and
a remote storage node in communication with the local storage node via a network, each of the local and remote storage nodes comprising:
a fragment server having a plurality of storage devices, each of the storage devices to store a plurality of encoded fragments divided from values, and metadata associated with the encoded fragments, each of the fragment servers configured to repeatedly:
cross-check the encoded fragments stored on the fragment server's storage devices against the metadata stored on the fragment server's storage devices; and
schedule for recovery any fragments and/or metadata missing from the storage devices; and
wherein each fragment server at the local storage node is further configured to transmit messages to sibling fragment servers at the remote storage node to request that the sibling fragment servers verify storage of sibling fragments.

17. The system as recited in claim 16, wherein a first portion of the encoded fragments is stored on a first storage device at the local storage node, and wherein the metadata corresponding to the first portion is stored on a second storage device at the local storage node.

18. The system as recited in claim 16, wherein each fragment server is further configured to determine whether each stored fragment is a most recent version, and to delete from the storage devices any fragments that are not the most recent version.

19. The system as recited in claim 16, wherein each fragment server is configured to append to a convergence log an entry corresponding to a missing fragment and/or missing metadata to schedule the recovery.

20. The system as recited in claim 19, wherein each fragment server is configured to converge the entry in the convergence log to an At Maximum Redundancy (AMR) state.

21. The system of claim 16, wherein each of the values are divided into respective encoded fragments, and where the metadata specifies a number of encoded fragments that each of the values is to be divided into.

* * * * *